United States Patent [19]

Moss

[11] 4,081,513

[45] Mar. 28, 1978

[54] DISPOSAL OF SULFUR OXIDE POLLUTANT-CONTAINING GAS

[75] Inventor: Gerald Moss, Oxford, England

[73] Assignee: The United States of America as represented by Administrator U.S. Environmental Protection Agency, Washington, D.C.

[21] Appl. No.: 639,132

[22] Filed: Dec. 9, 1975

[30] Foreign Application Priority Data

Dec. 11, 1974 United Kingdom ............... 53536/74

[51] Int. Cl.$^2$ .......................... C01B 17/00; B01J 8/00
[52] U.S. Cl. ..................................... 423/244; 423/242
[58] Field of Search ............................... 423/242–244, 423/210, 230, 231, 239

[56] References Cited

U.S. PATENT DOCUMENTS

| 3,870,840 | 3/1975 | Moss | 423/244 |
| 3,929,968 | 12/1975 | Taub | 423/242 |

Primary Examiner—O. R. Vertiz
Assistant Examiner—Gregory A. Heller

[57] ABSTRACT

A pollutant such as $SO_2$ is removed from a pollutant-containing gas stream by passing the stream to a drying zone to which a solution and/or dispersion of pollutant-reactive material (such as CaO) is supplied, the drying zone operating to evaporate the liquid (e.g. water) and at least some pollutant reacting with the material to form an innocuous disposable solid which is removed, the pollutant-depleted gas stream being scrubbed in a scrubbing zone by a solution and/or dispersion of pollutant-reactive material to form substantially pollutant-free gas which is vented to atmosphere, the solution and/or dispersion being recovered from the scrubbing zone, some being recirculated back to the scrubbing zone after the addition of required make-up liquid and/or pollutant-reactive material, and some being passed to the drying zone preferably after concentrating the pollutant-reactive material therein. Preferably, the drying zone is a bed of solids fluidized by the incoming hot pollutant-containing gas stream.

21 Claims, 1 Drawing Figure

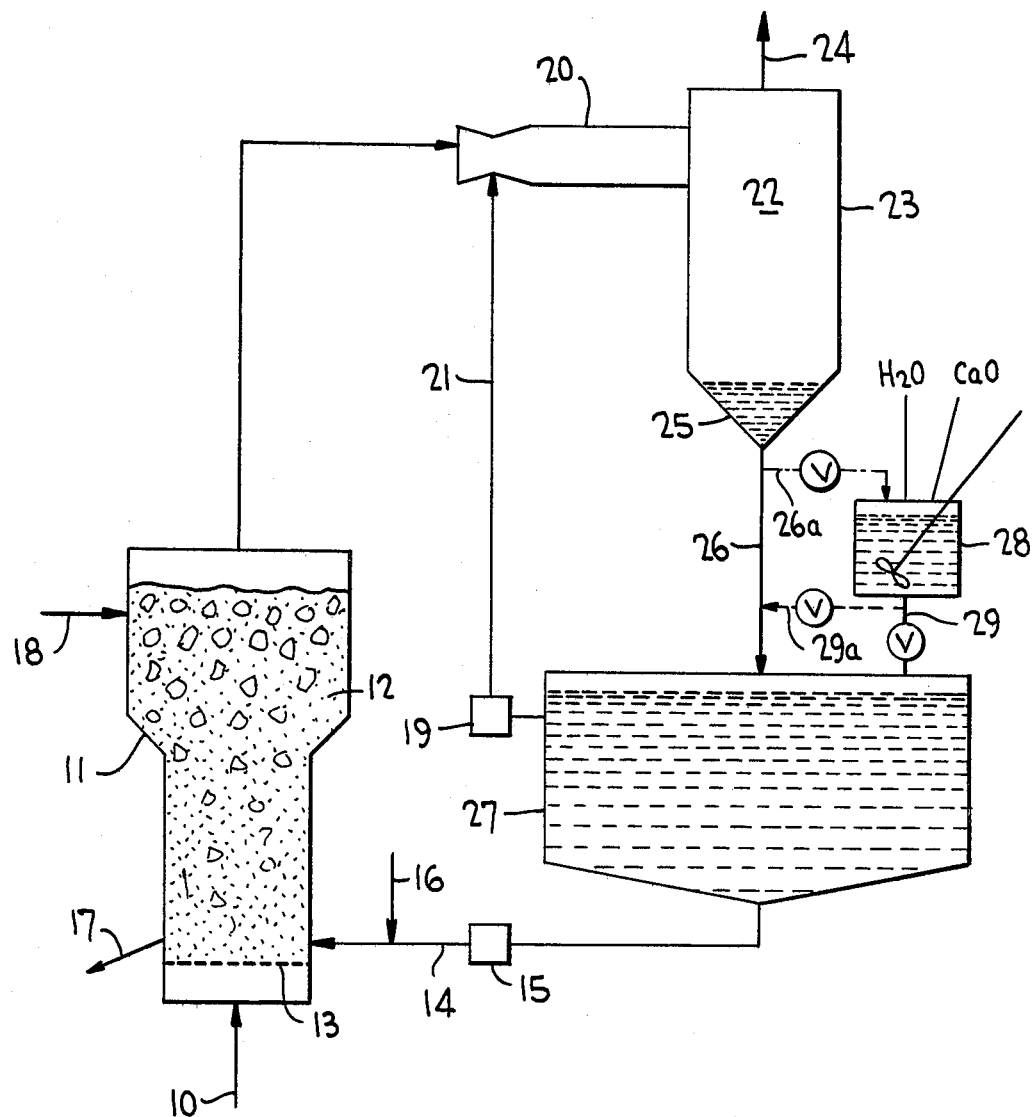

DISPOSAL OF SULFUR OXIDE POLLUTANT-CONTAINING GAS

The present invention relates to the disposal of pollutant-containing gases.

Pollutant-containing gases are produced in such processes as the combustion of sulphur-containing fuels to produce sulphur-containing combustible fuel gases when the combustion is substoichiometric and sulphur-containing flue gas when the combustion is effected in the presence of adequate oxygen for combustion. The roasting of certain ores such as zinc blende produces a sulphur-containing gas, as does the manufacture of sulphuric acid by the contact process. The manufacture of nitric acid produces waste gas streams containing nitrogen oxides, and in the foregoing instances and others, it is highly desirable to dispose of the pollutant gas or vapour as an innocuous substance to prevent environmental pollution. It is moreover desirable that the disposal should be a low cost operation and that the amount of innocuous substance produced should be relatively small so that the innocuous substance should not constitute an environmental pollutant. In one aspect, this invention comprises a method of disposing of a stream of pollutant-containing gas with a mixture comprising a dispersing liquid and dissolved and/or dispersed pollutant-reactive solid which is chemically reactive with the pollutant of the pollutant-containing gas to form an innocuous solid chemical compound, the contacting being effected in a drying zone under such conditions that the solid material is substantially dried and the dispersing liquid is evaporated into the gas stream, separating at least some of the dried solid material from the gas stream, scrubbing the gas and any entrained solid material in a scrubbing zone with a mixture comprising dispersing liquid and dissolved and/or dispersed pollutant-reactive solid material, separating substantially pollutant-free gas from the mixture leaving the scrubbing zone, recovering at least some of the mixture leaving the scrubbing zone, circulating some of the recovered mixture to the scrubbing zone to scrub further amounts of gas stream therein, and circulating some of the recovered mixture to the drying zone.

Pollutant-reactive solid material may be dispersed and/or dissolved in the dispersing liquid before and/or after the mixture is introduced into the scrubbing zone. In another aspect, the invention comprises apparatus for performing the foregoing method. Some of the pollutant gas stream passing through the drying zone will tend to be fixed by chemical reaction with pollutant-reactive solid in the drying zone and converted to innocuous material. The gas stream passing to the scrubbing zone will contain evaporated dispersing liquid, possibly entrained solid, and any pollutant which was not removed in the drying zone.

In the scrubbing zone, pollutant gas is substantially completely removed by reaction with the dispersed and/or dissolved solid in the scrubbing liquid, the pollutant reacting with the dispersed pollutant-reactive solid to form innocuous material. In addition, any entrained solids are substantially removed from the gas stream. Accordingly, after separation from the liquid phase, the gas stream is substantially free of pollutant and solids and may be vented to atmosphere. The gas may also contain evaporated dispersing liquid. In order to prevent a substantially constant amount of dispersing liquid, make-up dispersing liquid may be added to the liquid recovered from the scrubbing zone. Similarly, a make-up of pollutant-reactive solids is provided to maintain the reactivity of the dissolved and/or dispersed solids in the scrubbing liquid. The pollutant-reactive solids make-up may be at the same location as the dispersing liquid make-up.

Solids which are not circulated to the scrubbing zone are preferably concentrated (e.g. gravimetrically, if substantially insoluble) and circulated to the drying zone in admixture with as little dispersing liquid as is practical and/or economic. The make-up of solids should preferably be approximately equal to the amount of solids circulated to the drying zone.

The drying zone may comprise means for separating innocuous solid from the gas or gas/vapour stream. Such means may be a filter (e.g. a moving band or rotary filter). The solid separating means may be additionally, or preferably alternatively, a bed of particulate solid, particularly pollutant-reactive solid material. When such a bed is employed, the drying zone is preferably provided at one end (e.g. the bottom) of the bed, and the gas or gas/vapour mixture may entrain entrainable pollutant reactive solid material out from the other end (e.g. the top) of the bed, whereby the mixture comprising dispersing liquid and dispersed and/or dissolved pollutant-reactive solid may thus be augmented in the scrubbing zone. The relatively prolonged contact of the gas or gas/vapour mixture with any pollutant-reactive solid from between the drying zone and the region at which the gas is separated from the dispersing liquid after the scrubbing zone tends to increase the amount of pollutant which is removed by chemical reaction with the pollutant-reactive solid.

When a bed of solid material serves to separate the innocuous solid from the gas or gas/vapour stream, a bleed of solid from the bed is preferably provided. In a preferred embodiment, the bed is fluidized by the gas or gas/vapour stream passing therethrough. Pollutant-reactive solid is passed as make-up into dispersing liquid before the latter is passed to the scrubbing zone, and a bleed comprising innocuous solid is removed from the fluidized bed. Preferably, the drying zone forms part of the fluidized bed.

In a preferred embodiment of the invention, suitable materials may be added to the drying zone or to the bed to promote agglomeration of the innocuous solid to substantially non-entrainable-sized particles. Such materials may act chemically and/or physically on the innocuous solids to cause the latter to stick together and/or to stick to solid material in the bed to facilitate separation by size of the innocuous material from other solid material.

The pollutant-reactive material is preferably a cheap, readily-available substance, and most preferably, a waste material from another process. In a specific embodiment wherein the pollutant-containing gas is a gas containing a sulphur oxide (e.g. $SO_2$) or other gaseous or vapour phase acidic pollutants, the pollutant-reactive material may comprise calcium oxide or a thermal precursor thereof (e.g. limestone, dolomite, etc.) which may be a waste material from cement manufacture or from a process for desulphurising sulphur-containing substances such as a flue gas, a combustible fuel gas or sulphur-containing fuels. For example, it has been proposed that such sulphur-containing substances may be desulphurised by contact with calcium oxide. The calcium oxide fixes the sulphur predominantly as calcium sulphide under reducing conditions, or as calcium sulphate under oxidizing conditions or as calcium sulphite under oxidizing conditions at relatively low temperatures. According to some processes, the thus fixed sulphur is liberated as, e.g. $SO_2$ calcium oxide being regenerated which is then re-used for fixing further quantities of sulphur. Examples of such regenerative processes are described and claimed in U.K. Patent Specification Nos. 1,183,937 and 1,336,563. In other processes, the calcium-sulphur-containing material is not so regenerated. Whichever type of process is employed, the utilisation of the calcium oxide is not usually complete so that there is always some calcium oxide available for use in the process of this invention. Moreover, in the regenerative processes, the reactivity of the calcium oxide for fixing sulphur tends to decline with repeated use, and it is preferred to add fresh calcium oxide to the regenerative process to maintain the sulphur-fixing reactivity of the calcium oxide at an adequately high level and to bleed off or dump excess calcium oxide to maintain the desired inventory of calcium oxide and to avoid a build-up of decreasingly reactive calcium oxide. The thus bled-off or dumped calcium oxide may be used as pollutant-reactive solid in the process of the present invention.

The preferred scrubbing liquid is water since it is readily available at low cost in most locations. Moreover, the steam produced on drying the mixture of water and dispersed calcium oxide and sulphur compounds tends to improve the reactivity for fixing sulphur oxides of partly inactivated calcium oxide on contact therewith if partly inactivated calcium oxide is provided in a fluidized bed between the drying zone and the scrubbing zone, so that sulphur oxide is also fixed in the material of the fluidized bed. The water or other scrubbing liquid may contain ammonia to promote the dissolution of the pollutant in the liquid. The ammonia is subsequently recovered in the drying zone.

In preferred embodiments, the drying zone forms a part of such a fluidized bed, and any entrained solid compounds of calcium therefrom are passed through the scrubbing zone with partly stripped pollutant-containing gas where the pollutant (e.g. $SO_2$) and entrained solids are scrubbed out by water containing dissolved/dispersed calcium oxide, the resulting gas being substantially free of pollutant gas and solids, the two latter tending to react with each other and with the dissolved/dispersed calcium oxide to form, e.g. solid compounds of calcium and sulphur, the thus washed out solids being allowed to concentrate by gravimetric settling to form a slurry, and the slurry being injected into the fluidized bed adjacent the region at which hot pollutant-containing gas enters the bed, the sensible heat of the hot gas drying the injected slurry and the evaporated water passing through the fluidized bed and increasing the reactivity of the calcium oxide for fixing the pollutant in the entering hot gas. Suitable materials may be provided in the drying zone to cause the particles from the dried slurry to agglomerate with each other and with particles already in the bed. Such materials may be salts of alkali metals which melt at low temperatures. Mixtures of such salts melting at low temperatures are well-known in the art. Other materials which may be employed to cause agglomeration include resins, particularly cheap waste resinous materials, and low melting derivatives of glass.

A specific embodiment of the invention is now described by way of nonlimitative example with reference to the accompanying drawings which is a flow diagram of a plant for the disposal of $SO_2$ from a hot gas containing $SO_2$. Such a hot gas is liberated during the operation of the processes described in U.K. Patent Specifications Nos. 1,183,937 and 1,336,563 wherein either calcium sulphide or calcium sulphate are converted to calcium oxide at temperatures in the range 800°–1200° C, more particularly 1000° to 1150° C, the calcium oxide being circulated to a fluidized bed in which a sulphur-containing fuel is fully or partly combusted to yield a hot substantially sulphur-free flue or combustible gas respectively and the sulphur of the fuel being fixed as solid compounds of calcium and sulphur which then are treated to convert these compounds to CaO and to liberate hot $SO_2$-containing gas. In some instances, the hot $SO_2$-containing gas thus liberated will contain free oxygen and it will be assumed for the following description that this is the case.

Referring to the drawing, the $SO_2$-containing gas at about 1060° C is mixed with air to provide additional oxygen and to reduce its temperature to within the range 800°–900° C or thereabouts. The resulting gas mixture is passed via line 10 into the base of a vessel 11 in which a bed 12 of particles comprising calcium oxide is supported on a gas distributor 13. The distributor 13 may be of any type and distributes the hot gas mixture substantially uniform into the base of the bed 12. The horizontal cross-sectional area of the lower part of the bed 12 is so chosen that for the rate of supply of hot gas mixture and the general characteristics of the particles in the bed 12, the particles will be fluidized in the lower part of the bed, the horizontal cross-section of the upper part of the bed 12 being greater than that of the lower part so that the upper part is either not fluidized, or is fluidized to a lesser extent than the lower part in order to reduce attrition and the production of fines from the bed 12.

A slurry comprising calcium sulphate and/or sulphite and unreacted lime in water is passed into the bottom region of the bed 12 via line 14. For preference, the water content of the slurry should be as low as possible, the lower limit being set by the capability of a slurry pump 15 and of suitable slurry concentrating means. The water content of the slurry may be, for example, up to 70 wt.%, and preferably 60 wt.% or less.

The sensible heat of the gas from line 10 maintains the temperature of the bottom region of the bed 12 adequately high to evaporate the water of the slurry so that the solids and solutes therein are dried in the base of the bed. In the presence of the oxygen supplied with the incoming hot gas, the sulphites are substantially wholly converted to sulphates. In the course of drying, the solids/solutes of the slurry tend to agglomerate with each other and/or with particles previously in the bed 12 so that they eventually form particles of characteristics such that they cannot be entrained out of the bed 12 to any significant extent. If necessary, a suitable material for promoting agglomeration in the bed 12 may be added to the slurry, e.g. from line 16; this suitable material may be a mixture of alkali metal salts such as $Na_2CO_3$, $K_2CO_3$, KCl, $KNO_3$, etc.

Solids which have agglomerates to a substantially non-fluidable size in the bottom of the bed 12 are discarded from the bottom region via outlet 17, additional particles being added via inlet 18 to maintain a substantially constant depth of the bed 12. The discarded particles may be useful in the construction industry, agriculture, metallurgy and paper manufacture, or they may be re-used in the process of the present invention by being ground to a smaller size and returned to the inlet 18. Alternatively, or in addition, the particles passed into the bed 12 from inlet 12 may be dumped, partly deactivated materials from a regenerator or converter wherein CaS or CaSO₄ from a fuel desulphurising - part or full combusting plant is converted to CaO with the liberation of hot SO₂-containing gas.

The water evaporated from the slurry in the bottom region of the bed 12 passes upwardly and tends to increase the reactivity of partly deactivated containing materials, possibly by altering the crystal structure thereof and/or possibly by chemical action thereon, so that the ability of the particles in the bed 12 to fix $SO_2$ as e.g. $CaSO_4$ is enhanced.

The gas leaving the top of the bed 12 is at a relatively lower temperature (e.g. 250° – 350° C) and is depleted in $SO_2$, but includes water vapour from the dried slurry and entrained fine particles comprising CaO from the bed 12. The gas/vapour/fines mixture is passed through a venturi scrubber 20 wherein it is scrubbed by a dilute lime slurry supplied by a pump 19 via line 21. In the scrubber 20, substantially all the remaining $SO_2$ (and any other sulphur oxides) and the fines are stripped out, and the gas/scrubbing liquid mixture passes into a disengaging zone 22 of a separating vessel 23. Cool gas containing water vapour, but which is substantially free of sulphur oxides and solid materials, is vented from the vessel 23 via line 24.

The water/solids/unreacted sulphur oxides mixture falls to the conical base 25 of the vessel 23, and is passed via line 26 to a settling tank 27. Water to make up for evaporation losses is mixed with finely ground dumped lime particles in a mixing vessel 28, and the lime/water slurry added into the settling tank 27 via line 29. Alternatively, it may be preferred to mix the lime and water with some, or all of, the water/solids mixture from vessel 23 and pass the resulting mixture to the settling tank 27, as indicated by the broken lines 26a, 29a.

In the settling tank 27, the coarser particles accumulate at the conical base as a relatively concentrated slurry which is subsequently circulated by the pump 15 via line 15 to the drying zone in the bottom region of the bed 12. The finer and dissolved lime particles do not so settle and some are circulated by the pump 19 to the venturi scrubber 20 to strip $SO_2$ from the gas passing therethrough. The fresh lime material added via line 29 maintains the reactivity of the liquid mixture for fixing sulphur oxides in the venturi scrubber 20 and for fixing sulphur oxides from the incoming hot gas in the lower region of the bed 12.

From the foregoing, it will be appreciated that the pollution of the atmosphere by sulphur oxides and fine solid materials, and of the ground by incompletely inert or dilute $CaO/CaSO_4$ mixture is substantially avoided, the discarded and vented products of the process of the invention being substantially inoccuous.

The water employed in the scrubber may comprise dissolved ammonia to promote the dissolution of sulphur oxides therein. Ammonia is liberated during the drying of the slurry in the bottom region of the bed 12 and is recovered in solution in the venturi scrubber 20.

In a variant of the described embodiment, the solid material added via inlet 18 to the bed 12 may be any cheap inert material (i.e. not appreciably reactive to sulphur oxides or other pollutants), the pollutant fixing material being exclusively the finely ground lime (or dolomite, limestone, etc.) which is added via line 29. The inert material merely acts as a nucleus upon which the slurry from lime 14 may be dried and/or agglomerated into particles of non-fluidizable size.

What we claim is:

1. A method of reducing the content of a sulfur oxide pollutant in a gas containing said pollutant, comprising the steps of:
   (a) contacting the gas at an elevated temperature in a reaction zone with particulate solids of which at least some comprise calcium-containing pollutant-reactive material whereby at least a portion of said pollutant is removed from the gas by reaction with the pollutant-reactive material;
   (b) recovering from the reaction zone a gas of reduced pollutant content and entrained solids comprising at least some of said pollutant-reactive material, the temperature of the recovered gas exceeding the dew point of a liquid component of a gas-scrubbing liquid used in step (c);
   (c) scrubbing the recovered gas in a scrubbing zone with the scrubbing liquid referred to in step (b), said scrubbing liquid being selected from the group consisting of water and basic aqueous solutions, whereby to scrub out entrained solids from the recovered gas and to produce a scrubbed gas of reduced pollutant content;
   (d) recovering gas-scrubbing liquid containing solids scrubbed out of the gas in the scrubbing zone;
   (e) circulating a first portion of the recovered gas-scrubbing liquid to the scrubbing zone to scrub further amounts of recovered gas, and
   (f) passing a second portion of the recovered gas-scrubbing liquid in contact with the particulate solids whereby to evaporate the said liquid component into the gas in the reaction zone and to deposit on the particulate solids solid materials remaining after the evaporation of the said liquid component.

2. The method of claim 1 in which the particulate solids are disposed in a bed in the reaction zone and the pollutant-containing gas enters the bed at one end and leaves at the opposite end.

3. The method of claim 2 wherein the said one end is at the bottom of the bed and the said opposite end is at the top of the bed.

4. The method of claim 3 wherein the gas passing through the bed fluidizes particulate solids at least in a lower region of the bed.

5. The method of claim 4 wherein the said second portion of gas-scrubbing liquid is passed into the said lower region of the bed.

6. The method of claim 1 wherein the said second portion of gas-scrubbing liquid is enriched in deposit-forming solid materials by concentrating the latter in the liquid.

7. The method of claim 4 wherein an agglomeration-promoting substance is added to the fluidized region of the particulate solids bed to promote agglomeration of solids therein to a size which is not entrainable by the gas leaving the reaction zone.

8. The method of claim 7 wherein at least some of said agglomeration-promoting substance is added to the second portion of gas-scrubbing liquid being passed into contact with the particulate solids in the reaction zone.

9. The method of claim 1 wherein the gas-scrubbing liquid contains a calcium-containing pollutant-reactive reagent for removing further quantities of said pollutant from the gas passing through the scrubbing zone.

10. The method of claim 9 wherein pollutant-reactive reagent is added to the gas-scrubbing liquid to maintain the pollutant-removing properties of the first portion of gas-scrubbing liquid.

11. The method of claim 9 wherein the pollutant-reactive reagent is selected from the group consisting of calcium oxide-containing materials and calcium carbonate-containing materials.

12. The method of claim 1 wherein the pollutant-reactive material of the reaction zone is selected from the group consisting of calcium oxide-containing materials and calcium carbonate-containing materials.

13. The method according to claim 1 wherein the pollutant comprises sulfur dioxide.

14. The method according to claim 1 wherein the said liquid component of the gas-scrubbing liquid is water.

15. The method according to claim 1 wherein the gas-scrubbing liquid comprises ammonia to promote dissolution of the pollutant therein in the gas-scrubbing zone.

16. The method of claim 1 in which the pollutant-containing gas contains free oxygen.

17. The method of claim 1 wherein the pollutant-containing gas enters the reaction zone at a temperature of from 800° to 900° C.

18. The method of claim 1 wherein the temperature of the gas recovered from the reaction zone is from 250° to 350° C.

19. The method of claim 1 wherein solid material comprising innocuous solids is bled from the reaction zone.

20. The method of claim 1 in which quantities of the said liquid component are added to the gas-scrubbing liquid to compensate for any liquid component removed with the said scrubbed gas.

21. The method according to claim 1 wherein the pollutant comprises sulfur dioxide and the pollutant-reactive material of the reaction zone is selected from the group consisting of calcium oxide-containing materials and calcium carbonate-containing materials.

* * * * *